(12) United States Patent
Kurikawa (10) Patent No.: US 9,454,274 B1
(45) Date of Patent: *Sep. 27, 2016

(54) ALL POINTS ADDRESSABLE TOUCH SENSING SURFACE

(71) Applicant: Cypress Semiconductor Corporation, San Jose, CA (US)

(72) Inventor: Yohei Kurikawa, Tokyo (JP)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,240

(22) Filed: Aug. 19, 2014

Related U.S. Application Data (63) Continuation of application No. 13/072,634, filed on Mar. 25, 2011, now Pat. No. 8,810,543.

(60) Provisional application No. 61/345,061, filed on May 14, 2010.

(51) Int. Cl.
*G06F 3/045* (2006.01)
*G06F 3/044* (2006.01)

(52) U.S. Cl.
CPC ..................... *G06F 3/044* (2013.01)

(58) Field of Classification Search
CPC ............... G06F 3/044; G06F 3/0416; G06F 2203/04104
See application file for complete search history.

(56) References Cited

U.S. PATENT DOCUMENTS

| | | | |
|---|---|---|---|
| 3,904,822 A | 9/1975 | Kamm et al. | |
| 5,367,130 A | 11/1994 | Isono | |
| 5,420,379 A | 5/1995 | Zank et al. | |
| 5,543,591 A | 8/1996 | Gillespie et al. | |
| 5,995,084 A | 11/1999 | Chan et al. | |
| 6,011,545 A | 1/2000 | Henderson et al. | |
| 6,323,845 B1 | 11/2001 | Robbins | |
| 6,323,846 B1 | 11/2001 | Westerman et al. | |
| 7,170,468 B2 | 1/2007 | Knopf | |

(Continued)

FOREIGN PATENT DOCUMENTS

| | | |
|---|---|---|
| EP | 1256902 A1 | 11/2002 |
| EP | 1477889 A1 | 11/2004 |

(Continued)

OTHER PUBLICATIONS

"Intuos4 Pen Tablet | Wacom Americas," Copyright 2011 Wacom, downloaded from http://www.wacom.com/en/Products/Intuos.aspx on Jun. 29, 2011, 3 pages.

(Continued)

*Primary Examiner* — Lun-Yi Lao
*Assistant Examiner* — Peter D McLoone
(74) *Attorney, Agent, or Firm* — Morgan, Lewis & Bockius LLP (57) ABSTRACT

A touch-sensing apparatus may include a first controller configured to measure a first set of capacitance values from a first area of a touch-sensing surface and a second controller coupled with the first controller, where the second controller is configured to receive the first set of capacitance values from the first controller, and calculate a first position of a contact at the touch-sensing surface based on the first set of capacitance values and a second set of capacitance values measured from a second area of the touch-sensing surface adjacent to the first area of the touch-sensing surface.

20 Claims, 7 Drawing Sheets

(56) References Cited

U.S. PATENT DOCUMENTS

| | | |
|---|---|---|
| 7,663,607 B2 | 2/2010 | Hotelling et al. |
| 7,800,592 B2 | 9/2010 | Kerr et al. |
| 7,848,825 B2 | 12/2010 | Wilson et al. |
| 8,022,940 B2 | 9/2011 | Hung et al. |
| 8,125,463 B2 | 2/2012 | Hotelling et al. |
| 8,310,459 B2 | 11/2012 | Nurmi |
| 8,350,824 B2 | 1/2013 | Hung et al. |
| 8,358,285 B2 | 1/2013 | Leung et al. |
| 8,384,675 B2 | 2/2013 | Westerman et al. |
| 8,405,618 B2 | 3/2013 | Colgate et al. |
| 8,592,698 B2 | 11/2013 | Hung et al. |
| 8,638,107 B2 | 1/2014 | Schwartz et al. |
| 8,704,781 B2 | 4/2014 | Kii |
| 8,810,543 B1 | 8/2014 | Kurikawa |
| 8,976,121 B2 * | 3/2015 | Hung et al. .................. 345/173 |
| 9,019,212 B2 * | 4/2015 | Lin et al. ..................... 345/173 |
| 2002/0122029 A1 | 9/2002 | Murphy |
| 2006/0097991 A1 | 5/2006 | Hotelling et al. |
| 2006/0197750 A1 | 9/2006 | Kerr et al. |
| 2007/0165006 A1 | 7/2007 | Sato et al. |
| 2007/0188474 A1 | 8/2007 | Zaborowski |
| 2008/0158177 A1 | 7/2008 | Wilson et al. |
| 2009/0096757 A1 | 4/2009 | Hotelling et al. |
| 2009/0096758 A1 | 4/2009 | Hotelling et al. |
| 2009/0174679 A1 | 7/2009 | Westerman |
| 2009/0231288 A1 | 9/2009 | Liao |
| 2009/0244016 A1 | 10/2009 | Casparian et al. |
| 2009/0250269 A1 | 10/2009 | Hung et al. |
| 2009/0251428 A1 | 10/2009 | Hung et al. |
| 2009/0251429 A1 | 10/2009 | Hung et al. |
| 2009/0251437 A1 * | 10/2009 | Hung et al. .................. 345/174 |
| 2009/0256817 A1 | 10/2009 | Perlin et al. |
| 2009/0322689 A1 | 12/2009 | Kwong et al. |
| 2010/0259494 A1 | 10/2010 | Kii |
| 2010/0259504 A1 | 10/2010 | Doi et al. |
| 2010/0283760 A1 | 11/2010 | Leung et al. |
| 2011/0018821 A1 | 1/2011 | Kii |
| 2011/0025636 A1 | 2/2011 | Ryu et al. |
| 2011/0069015 A1 | 3/2011 | Nurmi |
| 2011/0090155 A1 | 4/2011 | Caskey et al. |
| 2011/0148435 A1 | 6/2011 | Schwartz et al. |
| 2011/0254865 A1 | 10/2011 | Yee et al. |
| 2011/0291961 A1 | 12/2011 | Hsieh et al. |
| 2011/0316679 A1 | 12/2011 | Pihlaja |
| 2012/0075192 A1 | 3/2012 | Marsden et al. |
| 2012/0084697 A1 | 4/2012 | Reeves |
| 2012/0206381 A1 | 8/2012 | Pereverzev et al. |
| 2012/0268376 A1 | 10/2012 | Bi |
| 2012/0299873 A1 * | 11/2012 | Hung et al. .................. 345/174 |
| 2012/0313861 A1 | 12/2012 | Sumi et al. |
| 2013/0009900 A1 | 1/2013 | Pryor |
| 2015/0062040 A1 * | 3/2015 | Park et al. .................... 345/173 |
| 2015/0116256 A1 * | 4/2015 | Hsu et al. ..................... 345/174 |
| 2015/0116257 A1 * | 4/2015 | Hsu et al. ..................... 345/174 |

FOREIGN PATENT DOCUMENTS

| | | |
|---|---|---|
| EP | 1657819 B1 | 5/2006 |
| JP | 61060117 A1 | 3/1986 |
| JP | 3210621 A1 | 9/1991 |
| JP | 6176198 A1 | 6/1994 |
| JP | 9146686 A1 | 6/1997 |
| WO | WO2012172364 A2 | 12/2012 |
| WO | WO2013120071 A1 | 8/2013 |

OTHER PUBLICATIONS

"Wacom Intuos3 6x8-Inch Pen Tablet," downloaded from http://www.amazon.com/Wacom-Intuos3-8-Inch-Pen-Tablet/dp/B00030097G on Jun. 29, 2011; 3 pages.

U.S. Appl. No. 13/072,634: "All Points Addressable Touch Sensing Surface" Yohei Kurikawa et al., filed on Mar. 25, 2011; 56 pages.

Tevfik Metin Sezgin and Randall Davis, MIT Computer Science and Artificial Intelligence Laboratory, Cambridge, MA, "Scale-space Based Feature Point Detection for Digital Ink," Copyright 2004, downloaded from http://rationale.csail.mit.edu/publications/Sezgin2004Scalespace.pdf on Jun. 29, 2011; 7 pages.

USPTO Advisory Action for U.S. Appl. No. 13/072,634 dated May 22, 2014; 3 pages.

USPTO Advisory Action for U.S. Appl. No. 13/072,634 dated Jul. 17, 2013; 3 pages.

USPTO Advisory Action for U.S. Appl. No. 13/072,634 dated Aug. 30, 2013; 3 pages.

USPTO Final Rejection for U.S. Appl. No. 13/072,634 dated Mar. 12, 2014; 12 pages.

USPTO Final Rejection for U.S. Appl. No. 13/072,634 dated May 23, 2013; 11 pages.

USPTO Non-Final Rejection for U.S. Appl. No. 13/072,634 dated Feb. 27, 2013; 13 pages.

USPTO Non-Final Rejection for U.S. Appl. No. 13/072,634 dated Oct. 10, 2013; 12 pages.

USPTO Notice of Allowance for U.S. Appl. No. 13/072,634 dated Jun. 20, 2014; 8 pages.

Cypress, International Search Report and Written Opinion, PCTUS2013/065758, dated Nov. 27, 2013, 14 pgs.

Tucker, Office Action, U.S. Appl. No. 13/928,695, Sep. 17, 2013, 26 pgs.

Tucker, Office Action, U.S. Appl. No. 13/928,695, Feb. 28, 2014, 36 pgs.

Tucker, Office Action, U.S. Appl. No. 13/928,695, Jul. 16, 2014, 13 pgs.

Tucker, Final Office Action, U.S. Appl. No. 13/928,695, Sep. 9, 2014, 16 pgs.

Tucker, Notice of Allowance, U.S. Appl. No. 13/928,695, Jan. 28, 2015, 11 pgs.

Tucker, Office Action, U.S. Appl. No. 13/928,695, Feb. 24, 2015, 20 pgs.

Tucker, Office Action, U.S. Appl. No. 13/928,695, Jul. 17, 2015, 21 pgs.

Tucker, Notice of Allowance, U.S. Appl. No. 13/928,695, Apr. 29, 2016, 10 pgs.

\* cited by examiner

ALL POINTS ADDRESSABLE TOUCH SENSING SURFACE

RELATED APPLICATIONS

This application is a continuation of U.S. patent application Ser. No. 13/072,634, filed on Mar. 25, 2011, now U.S. Pat. No. 8,810,543, Issued on Aug. 19, 2014, which claims the benefit of U.S. Provisional Application No. 61/345,061, filed on May 14, 2010, both of which are incorporated by reference herein.

TECHNICAL FIELD

This disclosure relates to the field of touchscreen controllers and, in particular, to calculating centroid locations based on capacitance measurements from a plurality of touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multidimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photosensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

Described herein is method and apparatus for calculating one or more centroid locations based on capacitance measurements from a plurality of capacitive touch sensing panels. In applications where an electronic capacitive touch sensor system allows a user to manipulate a cursor or other objects on a display, accurate centroid calculations allow the cursor to accurately represent the position and motion of an object, such as a finger or stylus, on the touch-sensor. In one embodiment, a centroid is a location that represents the "center of mass" or geometric center of an object at a touch-sensing surface. In one embodiment, a centroid may be represented as coordinates, such as X-Y coordinates in a Cartesian coordinate system. In embodiments wherein the capacitive touch sensor system measures the self capacitance of the sensor elements disposed along the X and Y axes, the center of mass for a touch is determined by the separate calculation of a 1-dimensional (1D) centroid for the X-axis sensor elements and a 1D centroid for the Y-axis sensor elements, wherein the intersection of the projection of these two 1D centroids into the sensor array determines the actual 2-dimensional (2D) centroid of the touch. In embodiments wherein the capacitive touch sensor system measures the mutual capacitance at the intersections of the sensor elements disposed along the X and Y axes, the center of mass for a touch is determined by a direct calculation of a 2D centroid. The accurate detection and calculation of centroid positions may also be important in applications where motion of a finger or stylus is tracked, such as drawing or handwriting recognition programs.

In one embodiment, two or more adjacent capacitive touch sensing panels may be arranged to emulate a single touch sensing panel having a surface area equal to the combined surface area of the individual touch panels. Each of the adjacent touch panels may be individually scanned by a corresponding slave controller to obtain a set of capacitance measurements from which one or more centroid positions may be calculated for the touch panel. In one embodiment, a large touch-sensing surface constructed in this manner from multiple smaller touch panels may be used to overlay a single display to implement a touchscreen.

Centroid locations corresponding to contact locations of conductive objects contacting or proximate to the touch panel may be calculated based on the set of capacitance measurements. In one embodiment, a master controller may calculate the centroid positions of contact locations near adjacent edges of the individual touch sensing panels, while the slave controllers calculate centroid positions for contact locations over the remainder of the area of their respective touch panels.

Alternatively, a master controller may be perform a scan of a first of the individual touch panels, while also receiving edge capacitance values from a second adjacent touch panel measured by a slave controller. The master controller may calculate one or more centroid positions based on the measured capacitance values of the first touch panel and the received edge capacitance values of the second touch panel, while the slave controller calculates centroid positions based on the capacitance values measured from the remainder of the second touch panel area.

As described herein, a contact at a surface of one of the touch sensing panels, may be detected when a conductive object (e.g., a finger) physically touches the touch-sensing surface, or may be caused by a conductive object in proximity to the touch-sensing surface. One method for scanning a touch-sensing surface involves scanning or measuring changes in self capacitance associated with each row or column sensor element in the touch-sensing surface. Thus, performing a scan of the entire touch-sensing surface may include taking a number of measurements equal to the sum of the number of row elements plus the number of column elements.

All-points sensing of the touch-sensing surface, in which the locations of multiple contacts at the touch-sensing surface are determined, may be performed using mutual capacitance measurements. Since mutual capacitance measurements are taken between a pair of sensor elements, such as a row sensor element and a column sensor element, the number of measurements for scanning the entire touch-sensing surface may be equal to the number of row elements multiplied by the number of column elements.

Figure 1:
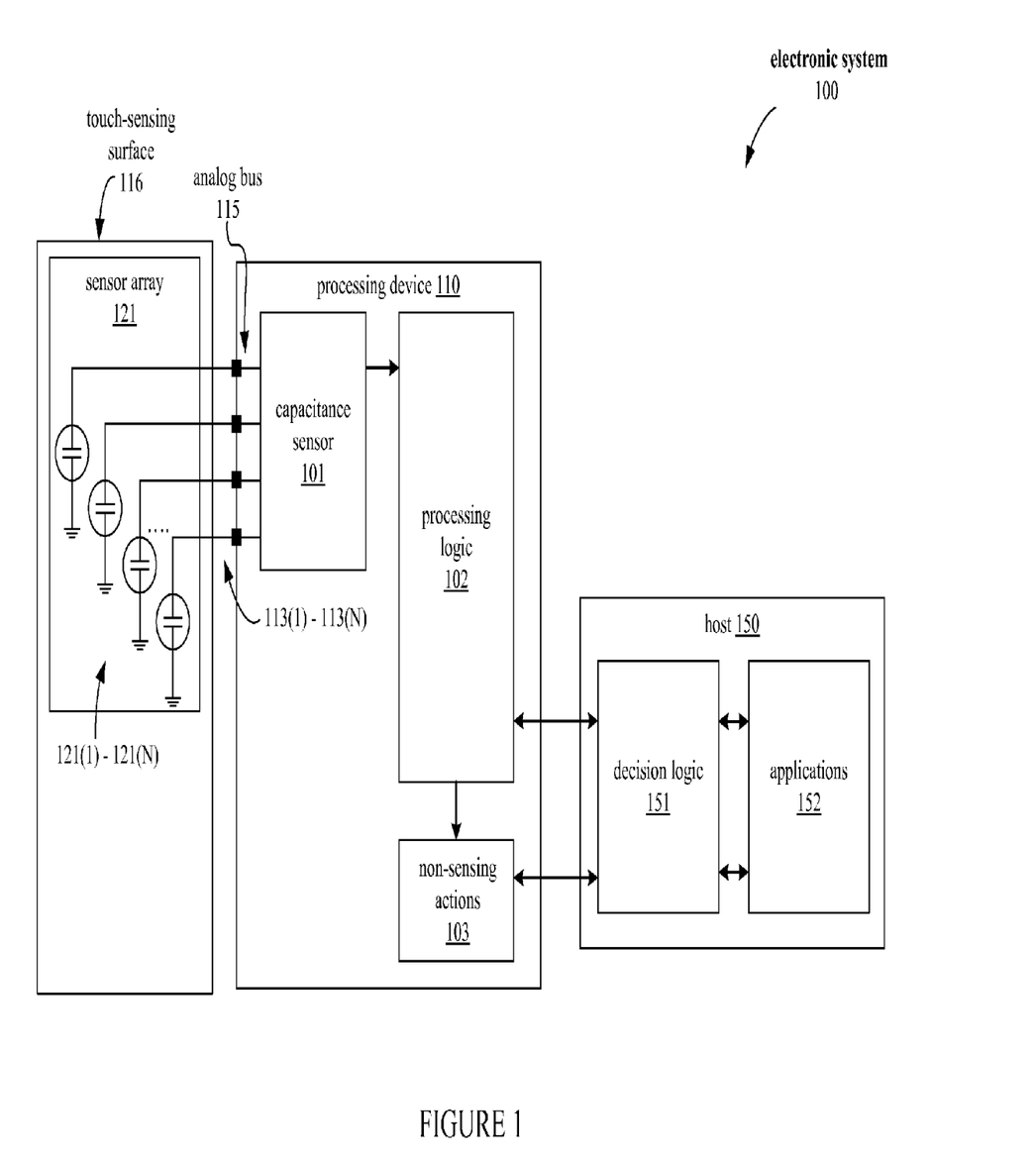
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116. In one embodiment, a device such as processing device 110 may be adapted for use as a slave or master controller as described above. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor. The self capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
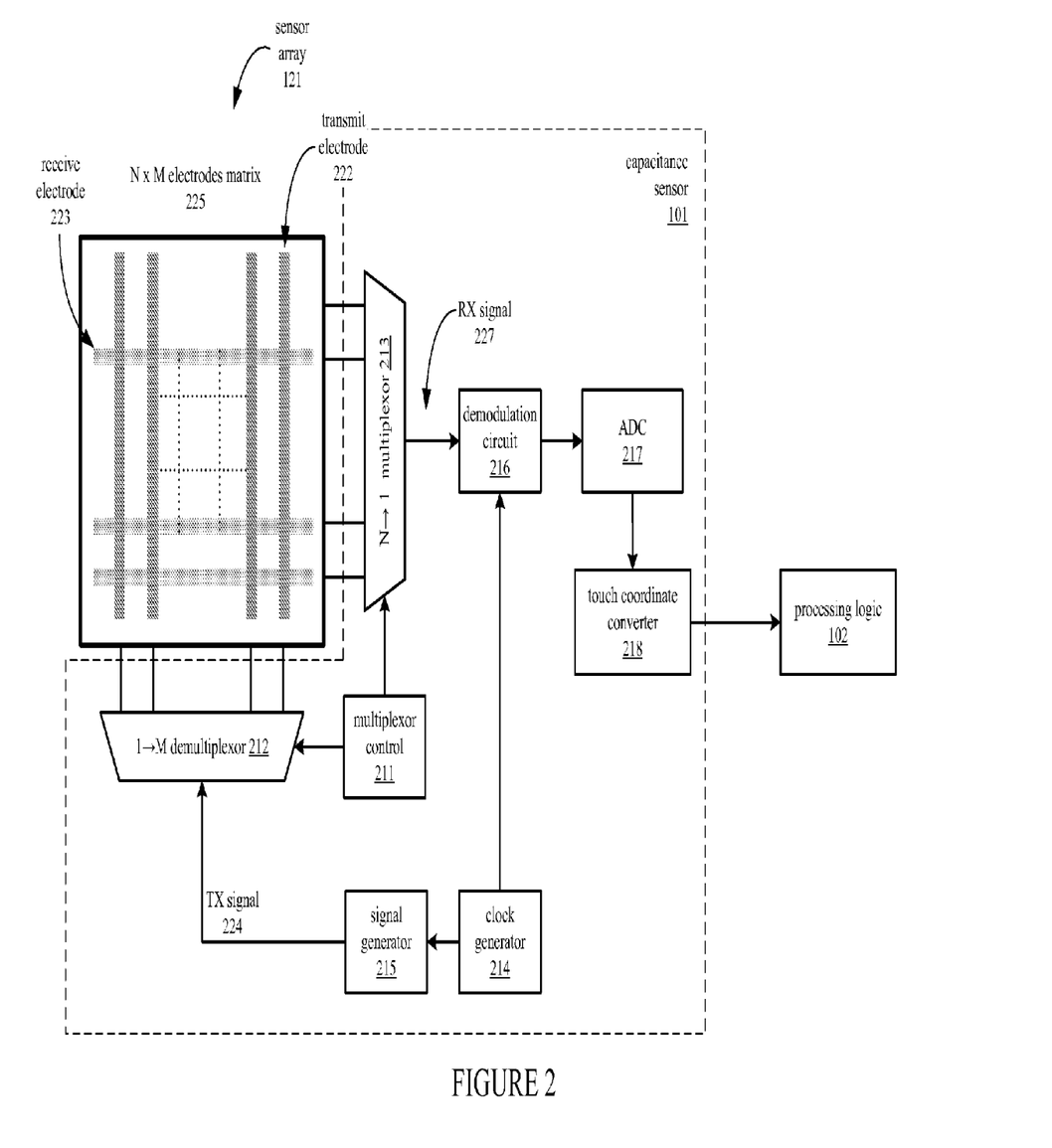
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, the sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Figure 3A:
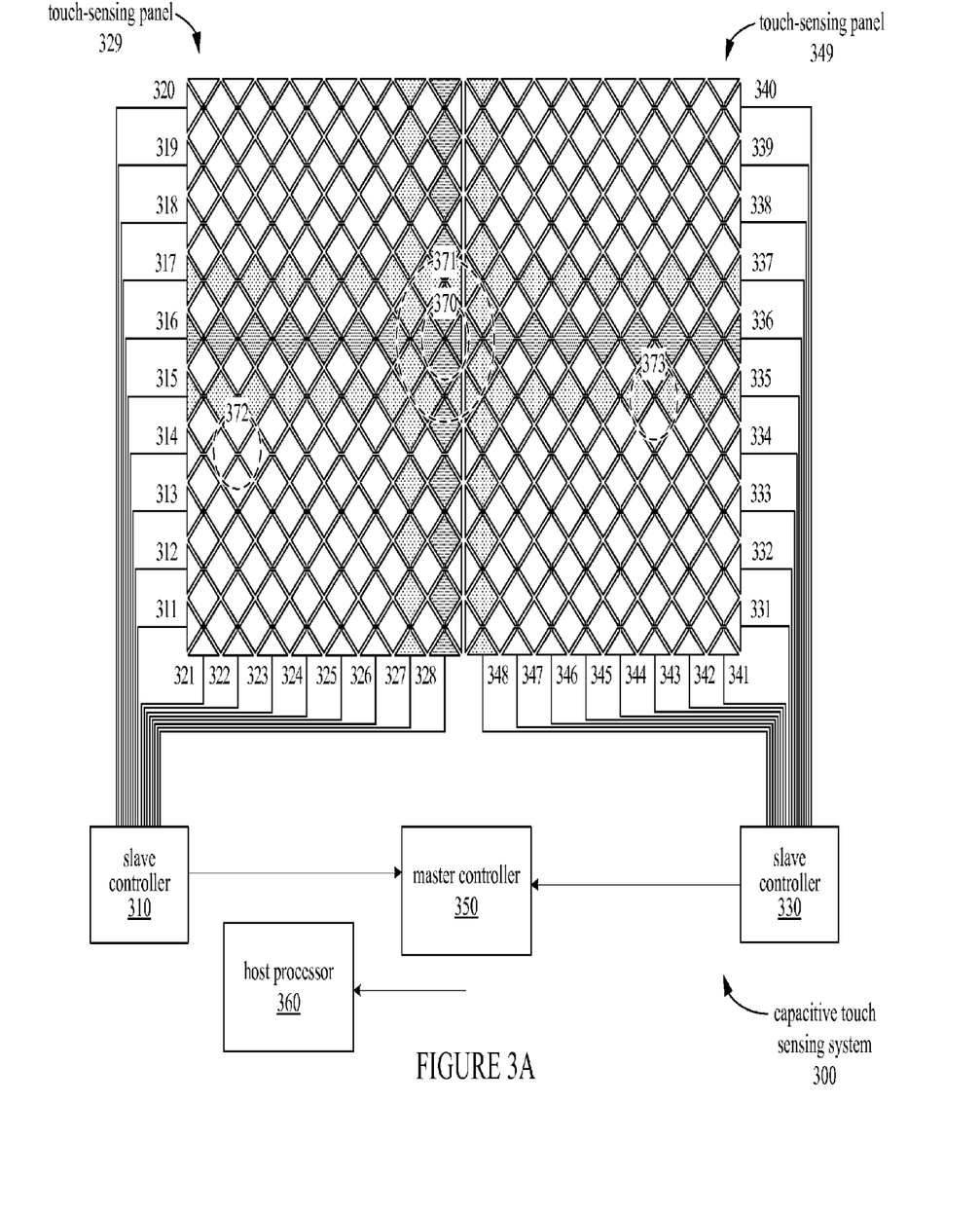
FIG. 3A illustrates an embodiment of a capacitive touch-sensing system including two touch-sensing panels.

FIG. 3A illustrates one embodiment of a capacitive touch-sensing system 300 having a master controller 350 and two slave controllers 310 and 330. In one embodiment, the slave controllers 310 and 330 may be implemented using processing devices similar to processing device 110, as illustrated in FIG. 1. In one embodiment, slave controllers 310 and 330 are coupled with touch-sensing panels 329 and 349, respectively. Touch-sensing panels 329 and 349 are arranged such that the right edge of panel 329 is adjacent to and parallel to the left edge of panel 349. Functions performed by the slave controllers 310 and 330 and the master controller 350 allow the two touch sensing panels 329 and 349 to emulate a single larger touch-sensing panel having an area approximately equal to the combined areas of panels 329 and 349.

Touch-sensing panel 329 includes a plurality of row sensor elements 311-320 and column sensor elements 321-328. Each of the row and column sensor elements 311-328 is connected with the slave controller 310. In one embodiment, the slave controller 310 performs a scan of touch-sensing panel 329 by performing a capacitance measurement of each of the intersections between the row sensor elements 311-320 and column sensor elements 321-328. Slave controller 330 is similarly coupled with touch-sensing panel 349, and may be configured to perform a scan of touch-sensing panel 349 be performing a capacitance measurement of each of the intersections between the row sensor elements 331-340 and the column sensor elements 341-348. In one embodiment, the capacitance measurements are mutual capacitance measurements. Alternatively, the capacitance measurements may be self capacitance measurements.

In one embodiment, controllers may compensate for differences (such as differences in geometry due to manufacturing tolerances) between adjacent touch panels from which they measure capacitances. For example, the slave controllers 310 and 330 may compensate for physical differences between their respective touch panels 329 and 349 that may affect the capacitances being measured from the panels. Differences in capacitances measured from the touch sensing panels 329 and 349 may be normalized within the slave controllers 310 and 330 by weighting or adding offsets to the measured capacitances. In one embodiment, the amount of weighting or offset may be determined by comparing baseline capacitances measured from each of the touch panels when no contact is present or proximate to any of the touch panels. In one embodiment, the amount of compensation may be determined dynamically at run time.

In one embodiment, slave controllers 310 and 330 may also calculate centroid positions based on the capacitance measurements of the intersections of sensor elements. For example, a conductive object contacting or proximate to the touch-sensing panel 329 may cause changes in the mutual capacitances measured between certain intersections of row and column sensor elements. The capacitance changes for each intersection are measured by the slave controller 310. In one embodiment, a centroid corresponding to the location of the conductive object at the touch-sensing panel 329 may be determined according to the magnitudes of the measured capacitance changes.

In one embodiment, the slave controllers 310 and 330 calculate centroid locations for contacts that occur at the surface of the touch-sensing panels 329 and 349 that are away from an edge adjacent to another touch-sensing panel. For example, slave controller 310 may perform centroid calculations for contacts detected away from the right edge of touch-sensing panel 329, which is adjacent to touch-sensing panel 349. Similarly, slave controller 330 may calculate centroid locations for contacts that occur at the surface of touch-sensing panel 349 that are away from the left edge of the panel 349, which is adjacent to touch-sensing panel 329. In one embodiment, the centroid locations calculated by the slave controllers 310 and 330 are transmitted to master controller 350.

In one embodiment, the slave controllers 329 and 349 determine, based on scans of the panels 329 and 349, when a contact location is near an edge adjacent to another touch-sensing panel. For example, the slave controller 329 may determine that a contact has occurred near the right edge of the touch-sensing panel 329 when sensor element 328 is activated such that a capacitance change is measured at sensor element 328. In one embodiment, the capacitance change may be measured at any of the intersections between column sensor element 328 and row sensor elements 311-320. Similarly, slave controller 330 may use measured capacitances of sensor element 348 to determine whether a contact has occurred near the left edge of the touch-sensing panel 349.

In one embodiment, the slave controllers may use capacitance measurements from more than one sensor element near the edge of the touch-sensing panel. For example, slave controller 310 may determine that a contact is near the right edge of the panel 329 when column sensor elements 327 or 328 are activated. In an alternative embodiment, determining whether a contact has occurred near the edge of the touch-sensing panel may be performed by the master controller 350, or by some other mechanism. In one embodiment, the edge contact may be detected using one or more additional capacitive sensors, optical sensors, pressure sensors, or other type of sensors.

In one embodiment, in response to determining that a contact has occurred near the edge of the touch-sensing panel adjacent another touch-sensing panel, a slave controller 310 or 330 may transmit the capacitance values from the edge to the master controller 350. For example, a contact within region 370 may cause capacitance changes measurable at the intersections with regions 370 and 371. Slave controller 310 measures the capacitances at these intersections, which are intersections between sensor elements 315-317 and 327-328. Slave controller 310 may determine that a contact has occurred near the right edge of panel 329 because sensor element 328 has been activated. For example, a slave controller 310 may determine that a sensor element has been activated when the measured capacitance value from that sensor element exceeds a threshold capacitance value. In response to determining that the edge contact has occurred, slave controller 310 transmits the capacitance values for the intersections between sensor elements 315-317 and 327-328 to the master controller. In one embodiment, only the capacitance values for the activated sensor elements are transmitted in response to detecting an edge contact. Alternatively, all edge capacitance values may be transmitted in response to detecting the edge contact.

In one embodiment, additional information, such as locations of any nearby centroids over the non-edge portion of the touch-sensing panel may be transmitted by a slave controller to the master controller 350. This information may be used to correct for effects caused by other contacts near any of the detected edge contacts.

The contact within region 370 also causes changes in capacitance measurable at the intersections between sensor elements 348 and 335-337 of touch-sensing panel 349. Slave controller 330 measures the capacitance changes at these intersections and determines that an edge contact has occurred because sensor element 348 has been activated. Slave controller transmits the capacitances measured at the intersections of elements 348 and 335-337 to the master controller 350. Thus, the master controller receives a set of capacitance values including the right edge capacitance values of panel 329 and the left edge capacitance values of panel 349.

In one embodiment, slave controllers 310 and 330 automatically transmit the capacitance measurements attributable to the edge contact to the master controller 350, without determining that an edge contact has occurred.

In one embodiment, the master controller 350 calculates a centroid location of the contact in region 370 based on the right edge capacitance values and the left edge capacitance values of panels 329 and 349, respectively. In one embodiment, the master controller 350 also receives centroid locations calculated by the slave controllers 310 and 330 based on capacitance values away from the adjacent edges of panels 329 and 349. For example, slave controller 310 may measure a set of capacitance values away from the right edge of panel 329. The set of capacitance values may include, for instance, intersections involving column sensor elements 321-326. Slave controller 310 may then determine a centroid location of a contact 372 based on the set of capacitance values and transmit the centroid location of the contact 372 to the master controller 350.

Similarly, slave controller 330 may measure capacitances for intersections involving sensor elements away from the left edge of panel 349, such as intersections involving sensor elements 341-346. Slave controller may then calculate a centroid location for a centroid location for contact 373 based on the measured capacitances, then transmit the calculated centroid location to master controller 350.

Thus, in one embodiment, the master controller 350 receives centroid locations for any contacts detected on panel 329 but away from the right edge of panel 329 and also receives centroid locations for any contacts detected on panel 349 but away from the left edge of panel 349. For example, master controller 350 may receive the centroid locations of contacts 372 and 373 from slave controller 310 and 330, respectively. The master controller 350 may also receive a set of capacitance measurements for the intersections near the right edge of panel 329 from slave controller 310 and a set of capacitance measurements for the intersections near the left edge of panel 349 from slave controller 330. The master controller may then calculate a centroid position for any contacts over or near these edges of the touch sensing panels 329 and 349. For example, the master controller 350 may calculate the centroid position of contact 370 based on edge capacitance values received from slave controller 310 and 330.

In one embodiment, having either received or calculated all the centroid positions over the surface of both panels 329 and 349, the master controller 350 may transmit the centroid locations to a host processor 360. In one embodiment, host processor 360 may correspond to host 150 as illustrated in FIG. 1. Host processor 360 may then use the centroid locations for gesture recognition, pointing, or other applications.

Figure 3B:
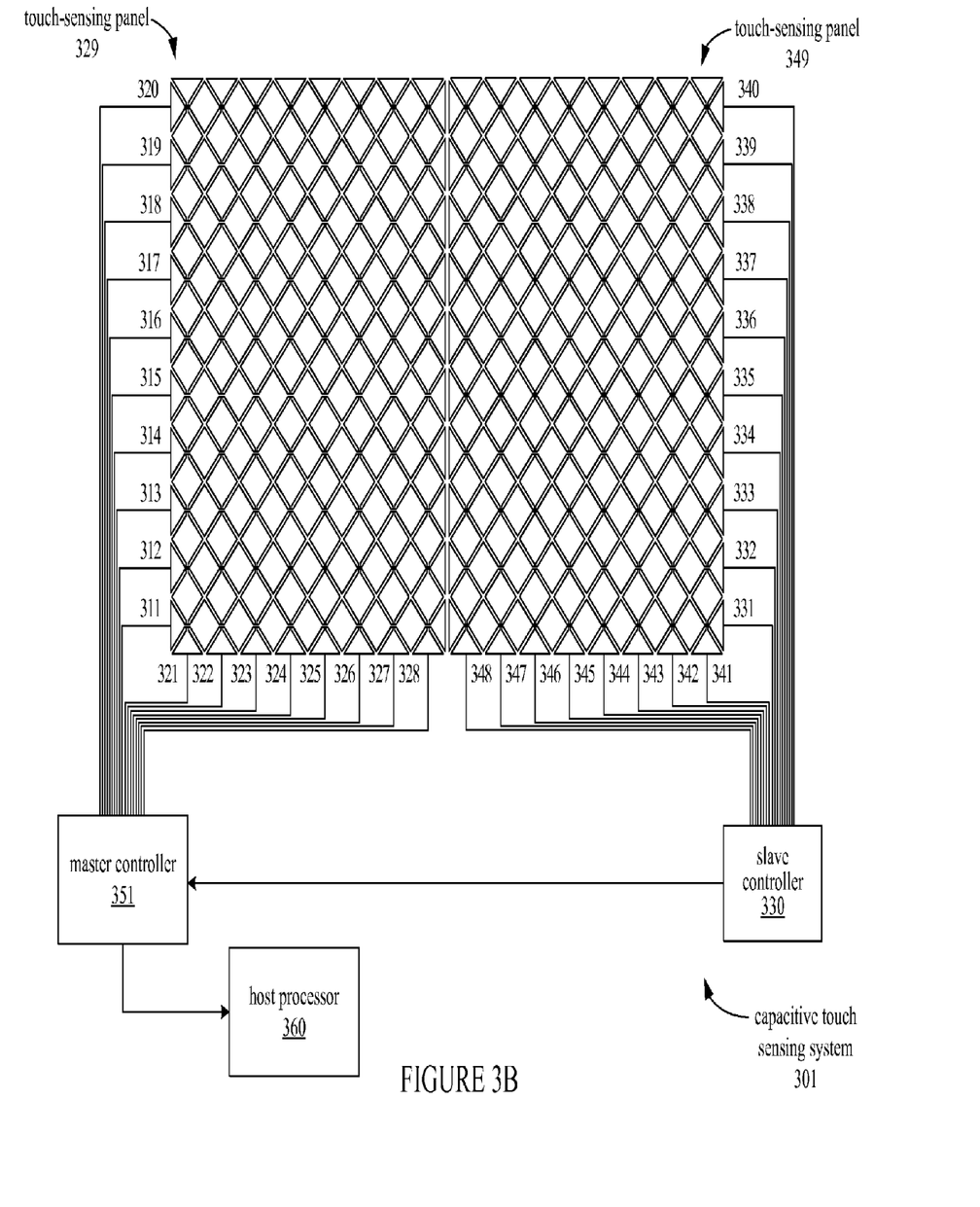
FIG. 3B illustrates an embodiment of a capacitive touch-sensing system including two touch-sensing panels.

FIG. 3B illustrates one embodiment of a capacitive touch-sensing system 301. Capacitive touch-system 301 functions in a similar fashion as capacitive touch-system 300, except that functions of master controller 350 and slave controller 301 are performed by a single master controller 351.

In one embodiment, master controller 351 measures capacitance values for all intersections of touch-sensing panel 329, while slave controller 330 measures capacitance values for all intersections of touch-sensing panel 349. Slave controller 330 may then transmit the capacitance values for the intersections near the left edge of panel 349, nearest the panel 329, to the master controller 351. Slave controller may also calculate centroid locations for contacts away from the left edge of panel 349 based on the measured capacitance values and transmit the centroid locations to master controller 351.

Master controller 351 receives the edge capacitance values from slave controller 330 and calculates one or more centroid locations based on the edge capacitance values received from slave controller 330 and the right edge capacitance values for panel 329 measured by the master controller 351 itself. Master controller 351 thus calculates centroid positions for contacts located near the adjacent edges of panels 329 and 349. Master controller 351 may also calculate the centroid positions for contacts over the remaining area of panel 329.

Having either calculated or received the centroid locations for contacts over the entire combined surface area of touch-sensing panels 329 and 349, the master controller 351 may transmit all centroid locations to a host processor 360. The host processor 360 may then update a display, perform gesture recognition, or perform other operations based on the centroid locations.

Figure 4A:
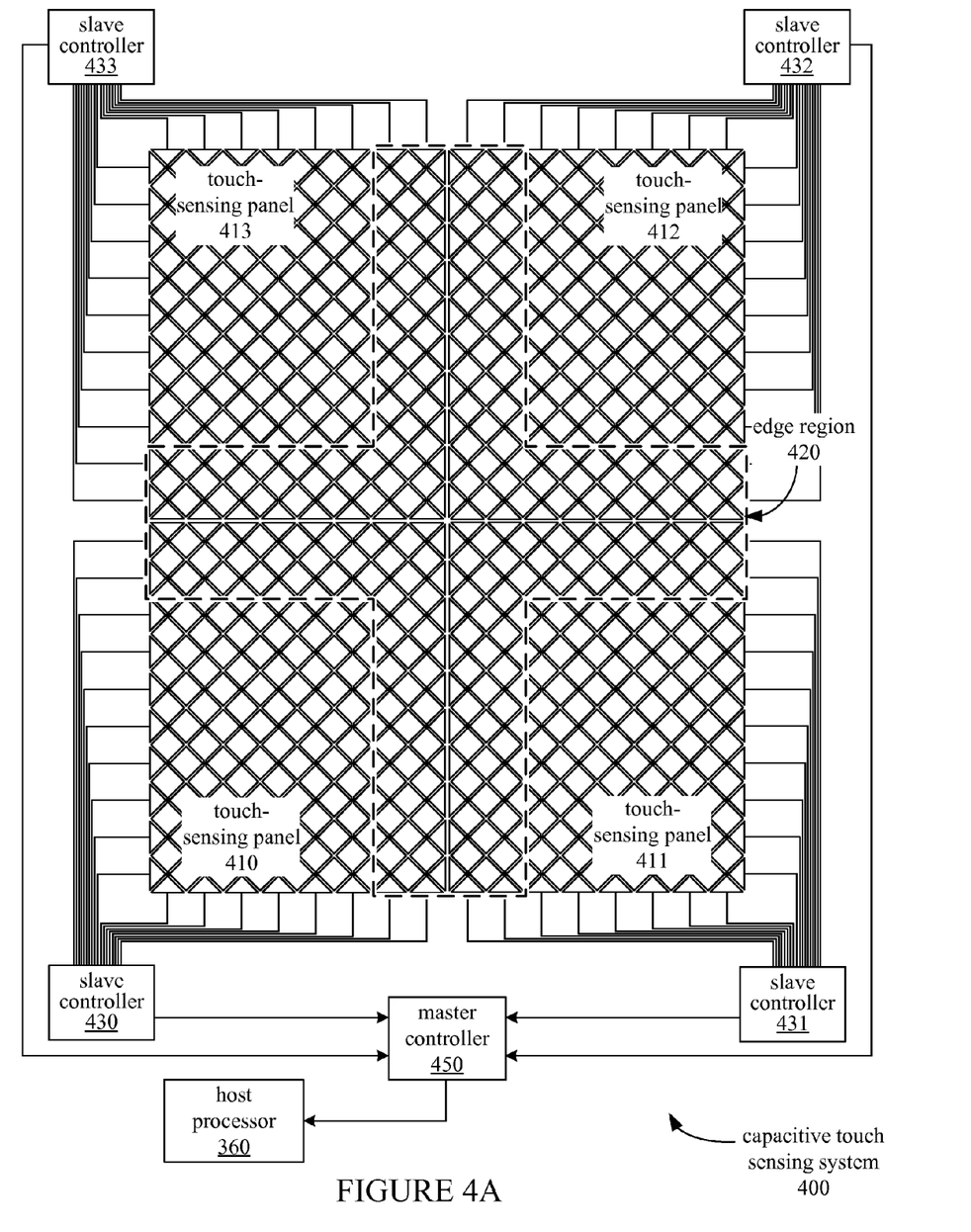
FIG. 4A illustrates an embodiment of a capacitive touch-sensing system including four touch-sensing panels.

In one embodiment, a capacitive touch-sensing system such as touch-sensing system 300 may be scaled to include four touch sensing panels. FIG. 4A illustrates one embodiment of a capacitive touch-sensing system 400 including four touch-sensing panels 410-413 coupled with corresponding slave controllers 430-433, respectively. In one embodiment, each of the slave controllers 430-433 is configured to measure capacitance values for each of the intersections in its corresponding touch-sensing panel. For example, slave controller 430 may measure a capacitance for each intersection of sensor elements in touch-sensing panel 410.

In one embodiment, an edge region 420 may include the areas near the adjacent edges of the touch sensing panels 411-413. For example, the boundaries of the edge region 420 may encompass the two sensor elements parallel to and nearest to each edge of a touch sensing panel that is adjacent to an edge of another touch-sensing panel. In alternative embodiments, the edge region may encompass more or fewer of the sensor elements nearest to and parallel to the adjacent edge. In one embodiment, the edge region may be defined in terms of absolute distance from the adjacent edges, rather than a number of sensor elements.

In one embodiment, each slave controller 430-433 also calculates, based on the measured capacitance values, centroid locations of contacts occurring outside of edge region 420. For example, slave controller 430 may use capacitance measurements for intersections outside of edge region 420 to calculate a set of centroid locations including a centroid location for each contact at touch-panel 410 that is outside of edge region 420.

In one embodiment, slave controller 430 does not calculate the centroid locations for contacts within edge region 420. Slave controller 430 may instead transmit the measured capacitances for intersections within the edge region 420 to the master controller.

In one embodiment, the slave controllers 431-433 operate in similar fashion as slave controller 430, such that each slave controller 430-433 calculates a set of centroid locations for contacts at their respective panels 410-413 that are outside the edge region 420. The slave controllers 430-433 may then transmit the centroid locations to the master controller 450. In one embodiment, in addition to the sets of centroid locations, each of the slave controllers 430-433 may also transmit to the master controller 450 a set of capacitance values including a capacitance value for each intersection from its respective touch-sensing panel that is within the edge region 420.

From the slave controllers 430-433, the master controller 450 receives centroid locations for contacts outside the edge region 420 for each of the panels 410-413, and also receives a set of measured capacitance values for the sensor element intersections within the edge region 420 for each of the touch-sensing panels 410-413. Using the capacitance values for the intersections within the edge region 420, the master controller may calculate centroid locations for contacts occurring within the edge region 420.

In one embodiment, each of the slave controllers 431-433 may transmit capacitance values or calculated centroid locations to another slave controller, which may then retransmit the capacitance values or centroid locations to another slave controller or to the master controller 450. For example, slave controller 431 may, instead of transmitting capacitance values or centroid locations to master controller 450, transmit this information to slave controller 432. Slave controller 432 may then transmit the information received from slave controller 431 to slave controller 433 along with capacitance values or centroid locations measured or calculated by slave controller 432. Slave controllers 433 and 430 may operate in a similar fashion, retransmitting information received from other slave controllers along with their own capacitance values or centroid locations to the next slave controller or to the master controller 450. In one embodiment, this chaining of slave controllers may be used to distribute processing load across controllers, allowing a single master controller to accommodate a greater number of slave controllers, and thus a greater number of touch-sensing panels.

Having received from the slave controllers 430-433 the centroid locations for contacts outside the edge region 420, and having calculated the centroid locations for contacts within the edge region 420, the master controller 450 may then transmit the full set of centroid locations to a host processor 360.

Figure 4B:
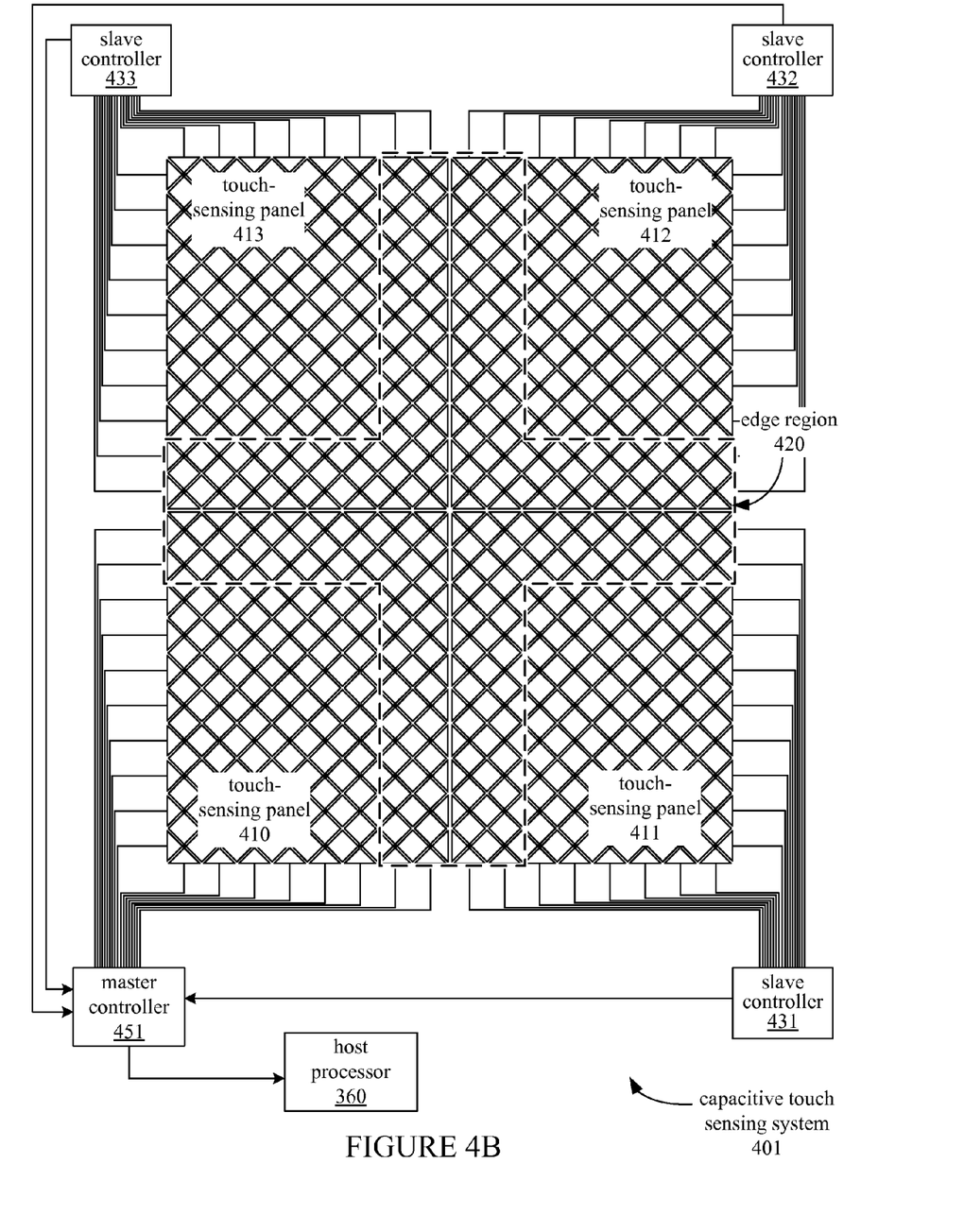
FIG. 4B illustrates an embodiment of a capacitive touch-sensing system including four touch-sensing panels.

In one embodiment, the functions of slave controller 430 may be combined with the master controller 450. FIG. 4B illustrates one embodiment of a capacitive touch-sensing system 401 that utilizes a master controller 451. Master controller 451 combines the functions performed by a slave controller such as slave controller 430 and a master controller such as master controller 450. In one embodiment, master controller 451 functions in similar fashion as master controller 351, except that master controller 451 receives centroid locations and measured capacitances from more slave controllers, including slave controllers 431-433.

In one embodiment, master controller 451 receives sets of centroid positions calculated by each of the slave controllers 431-433, which may include any centroid locations calculated based on capacitance values of intersections outside the edge region 420. Master controller 451 measures capacitance values for the intersections of panel 410 and receives capacitance values for the intersections of the other panels 411-413 that are within the edge region 420. Based on its own measured capacitance values for panel 410 and the capacitance values for the edge regions of panels 411-413, the master controller 451 calculates centroid locations for any contacts occurring within the edge region 420.

Having either calculated or received centroid locations for contacts across the combined surface area of touch-sensing panels 410-433, the master controller 451 may then transmit the centroid locations to a host processor 360. In an alternative embodiment, the functions of a master controller such as master controller 450 may be performed by a host processor.

In one embodiment, a master controller such as master controllers 350, 351, 450, or 451 may also control timing of the capacitance measurements performed at each touch-sensing panel to minimize interference between panels. For example, master controller 450 may signal to the slave controllers 430-433 to cause the slave controllers 430-433 to perform their scans such that no slave controller scans its respective touch-sensing panel simultaneously with another slave controller. As a further example, master controller 451 may time its own scan of panel 410 and the scans performed by each of the slave controllers 430-433 so that none of the controllers 451 or 431-433 perform their scans simultaneously. In one embodiment, a master controller such as master controller 450 may cause the slave controllers 430-433 to scan panels 410-413 sequentially such that a scan time of one panel does not overlap with the scan time of any of the other panels. In one embodiment, the master controller may cause the sequential scan of the set of touch panels to repeat continuously.

In an alternative embodiment, the scan timing may be controlled by a separate controller, such as the host processor 360, or the slave controllers may communicate to adjust timing using a synchronization protocol or by sending timing signals.

In one embodiment, instead of two or more independent touch panels, a single touch panel may be subdivided and each subdivision of the touch panel may be scanned using a separate slave controller. For example, with regard to FIG. 3A, each of the slave controllers 310 and 330, instead of being connected to panels 329 and 349, may be connected to sets of rows or column sensor elements of a single touch panel. These sets of sensor elements may or may not have sensor elements in common. For example, a first slave controller may be connected to all of the column sensor elements of a touch panel and a first half of the row sensor elements of the touch panel, while a second slave controller may be connected to all of the column sensor elements and a second half of the row sensor elements.

Figure 5:
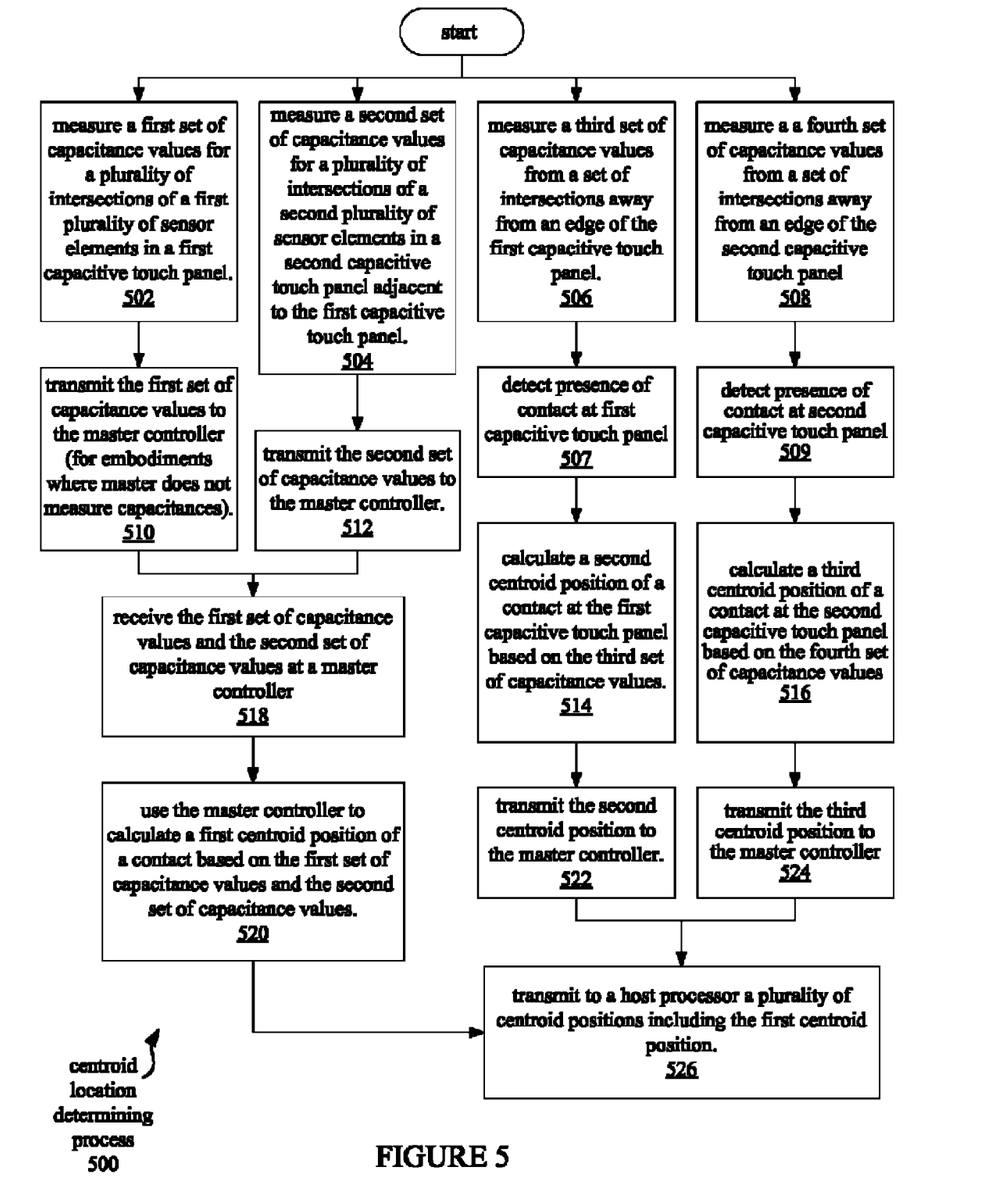
FIG. 5 is a flow diagram illustrating a process for calculating a centroid location for one or more contacts at a touch-sensing surface, according to an embodiment.

FIG. 5 illustrates a process 500 for determining centroid locations for one or more contacts at a plurality of touch-sensing panels. In one embodiment, the centroid location determining process 500 may be implemented using a system such as capacitive touch-sensing systems 300, 301, 400, or 401.

In one embodiment, the process 500 begins at block 502. At block 502, a master controller or a slave controller may measure a first set of capacitance values for a plurality of intersections of a first plurality of sensor elements in a first capacitive touch panel. For example, with reference to FIG. 3A, a slave controller 310 may measure a first set of capacitance values for the sensor element intersections of touch-sensing panel 329. In one embodiment, the first set of capacitance values includes capacitance values for intersections of sensor elements near an edge of the panel 329 adjacent to the edge of another panel 349. In an alternative embodiment, a first set of capacitance values may be measured by a master controller, such as master controller 351, as illustrated in FIG. 3B.

From block 502, the process 500 continues at block 510. At block 510, a slave controller may transmit the first set of capacitance values to a master controller. This operation may be performed by embodiments of a touch-sensing system such as touch-sensing system 300 or 400, where a master controller does not measure capacitance values.

From block 510, the process 500 continues at block 518, where the master controller receives the first set of capacitance values. In one embodiment, the master controller performs the measurement of the first set of capacitance values rather than receiving the first set of capacitance values from a slave controller, as described previously with reference to FIGS. 3B and 4B.

In one embodiment, the operations of block 504 may be performed simultaneously with the operations of block 502. Alternatively, the operations of block 504, which include measurements of capacitance values of a touch-sensing panel, may be performed before or after the capacitance measurements of block 502 to avoid signal interference during the measurement process. At block 504, a slave controller may measure a second set of capacitance values for a plurality of intersections of a second plurality of sensor elements in a second capacitive touch panel. In one embodiment, the second capacitive touch panel may be adjacent to the first capacitive touch panel. For example, with regard to FIG. 3A, slave controller 330 may measure a second set of capacitance values for intersections of sensor elements 331-348 of panel 349. In one embodiment, the second set of capacitance values may include capacitance values for intersections near the edge of panel 349 that is adjacent to panel 329.

From block 504, the process 500 continues at block 512. At block 512, the slave controller transmits the second set of capacitance values to the master controller. For example, in system 300, the slave controller 330 may transmit the second set of capacitance values (for the edge intersections of panel 349) to the master controller 350. Similarly, slave controller 330 of touch-sensing system 301 may transmit capacitance values for the edge intersections of panel 349 to master controller 351.

From block 512, the process 500 continues at block 518, where the master controller receives the second set of capacitances from the slave controller. Thus, in one embodiment, at block 518 the master controller receives both a first set and a second set of capacitance values, corresponding to the adjacent edges of the first capacitive touch panel and the second capacitive touch panel.

From block 518, the process 500 continues at block 520. At block 520, the master controller calculates is used to calculate a first centroid position of a contact based on the first set of capacitance values and the second set of capacitance values. For example, with regard to FIG. 3A, master controller 350 may use the first and second sets of edge capacitance values to calculate a centroid position of a contact 370 that is near the adjacent edges of panels 329 and 349. In one embodiment, the master controller 350 may also calculate centroid positions for more than one contact occurring near the adjacent edges of the touch-sensing panels 329 and 349.

In one embodiment, a slave controller or master controller that is configured to measure the first set of capacitance values for the edge intersections of the first touch-sensing panel may also measure a third set of capacitance values for a set of intersections away from an edge of the first capacitive touch panel, as provided at block 506. In one embodiment, measuring the third set of capacitance values may be performed as part of the same scan as measuring the first set of capacitance values. For example, a slave controller 310 may perform a scan of all intersections of panel 329, including the intersections near the adjacent edge and the intersections away from the adjacent edge. In an alternative embodiment, the measurement of the first and third sets of capacitance values may be performed by a master controller such as master controller 351 of FIG. 3B. From block 506, the process 500 continues at block 507.

At block 507, the slave or master controller detects a presence of a contact at the first capacitive touch panel. For example, a slave controller 310 or a master controller 351 may detect that a contact is present at touch-sensing panel 329 when any of the capacitance values measured from panel 329 exceeds a threshold capacitance value. In one embodiment, the process 500 continues at block 514 when a contact is detected at the touch-sensing panel.

At block 514, the master or slave controller, having measured the third set of capacitance values, calculates a second centroid position of a contact at the first capacitive touch panel based on the third set of capacitance values. For example, with regard to FIG. 3A, the slave controller may calculate a centroid position for a contact at location 372. A similar operation may be performed by master controller 351 of FIG. 3B. From block 514, the process 50 continues at block 522.

At block 522, in one embodiment, the slave controller transmits the one or more calculated centroid locations to a master controller. For example, slave controller 310 may transmit the location of a centroid corresponding to a contact at location 372 to master controller 350. In an alternative embodiment where the master controller, such as master controller 351, performs the centroid calculation, the operations corresponding to block 522 may not be necessary. From block 522, the process 500 continues at block 526.

Blocks 508, 509, 516, and 524 correspond to operations similar to the operations of blocks 506, 507, 514, and 522, respectively, except that the operations of blocks 508, 509, 516, and 524 may be performed by a slave controller connected with the second capacitive touch panel. In one embodiment, blocks 508, 509, 516, and 524 may be performed substantially in parallel with blocks 506, 507, 514, and 522. Alternatively, the operations of blocks 508, 509, 516, and 524 may be performed at different times than the operations of blocks 506, 507, 514, and 522. For example, the scans of each panel may be performed sequentially to avoid one panel's measurement scan from interfering with measurement scans of other panels.

At block 508, a slave controller connected with the second touch panel may measure a fourth set of capacitance values from a set of intersections away from an edge of the second capacitive touch panel. For example, with regard to FIG. 3A, slave controller 330 may measure capacitance values for sensor element intersections of touch-sensing panel 349 that are away from the left edge of panel 349. In one embodiment, the second set of capacitance values and the fourth set of capacitance values are measured as part of the same scan of panel 349. From block 508, the process 500 continues at block 509.

At block 509, the slave or master controller detects a presence of a contact at the first capacitive touch panel. For example, a slave controller 330 may detect that a contact is present at touch-sensing panel 349 when any of the capacitance values measured from panel 349 exceeds a threshold capacitance value. In one embodiment, the process 500 continues at block 516 when a contact is detected at the touch-sensing panel.

At block 516, the slave controller connected with the second touch panel may calculate a third centroid position of a contact at the second touch panel based on the fourth set of capacitance values. For example, the slave controller 330 may calculate a centroid position of a contact at location 373, which is away from the left edge of panel 349. From block 516, the process 500 continues at block 524.

At block 524, the slave controller connected with the second touch panel may transmit the calculated third centroid position to the master controller. For example, the slave controller 330 may transmit to the master controller 350 the calculated centroid location of the contact at location 373. From block 524, the process 500 continues at block 526.

At block 526, the master controller, having either calculated or received from a slave controller a set of centroid positions for every contact detected over the combined surface area of the first and second capacitive touch panels, the master controller may transmit the full set of centroid positions to a host processor. In one embodiment, this full set of centroid positions includes at least the first centroid position, which is detected near the adjacent edges of the first and second touch panels. For example, the master controller 350 may transmit to the host controller 360 any centroid locations calculated by the master controller 350, in addition to any centroid locations calculated by the slave controllers 310 and 330 and transmitted to the master controller 350 by the slave controllers 310 and 330. Upon receiving the centroid locations for any contacts detected over the combined surface area of the first and second panels 329 and 349, the host processor may use the centroid locations for further calculations or to perform operations such as updating a pointer, recognizing gestures, or other functions.

In one embodiment, the operations of process 500 may be repeated in a loop to continuously update the centroid locations of contacts at the touch-sensing surface comprising the first and second touch-sensing panels.

Thus, by performing the operations of process 500, a capacitive sensing system such as capacitive touch sensing systems 300, 301, 400, or 401 may determine centroid locations for one or more contacts over a combined surface area of two or more touch-sensing panels, while maintaining the ability to accurately calculate centroid locations for contacts near or crossing an edge boundary between touch-sensing panels. Such a capacitive touch sensing system may thus allow multiple touch-sensing panels to be combined to emulate a single larger touch-sensing panel.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
    a first controller and a second controller coupled to the first controller, wherein:
    the apparatus is coupled to a touch-sensing surface including a first area and a second area that are adjacent to each other, the first area including a first subset of sensor elements, and the second area including a second subset of sensor elements;
    the first controller is configured to:
        measure a first set of capacitance values associated with the first subset of sensor elements;
        in response to determining that a contact has occurred within a predetermined distance from an edge of the first area, provide the first set of capacitance values to the second controller; and
        in response to determining that a contact has occurred in the first area at a location having at least the predetermined distance from the edge, calculate a centroid position of the contact based on the first set of capacitance values and provide the centroid position to the second controller; and
    the second controller is configured to:
        in accordance with receiving the first set of capacitance values from the first controller, calculate the centroid position of the contact at the touch-sensing surface based on the first set of capacitance values and a second set of capacitance values, wherein the second set of capacitance values are measured from the second subset of sensor elements of the second area, and the first set of capacitance values and the second set of capacitance values are normalized.

2. The apparatus of claim 1, wherein the second controller is further configured to measure the second set of capacitance values from the second area of the touch-sensing surface.

3. The apparatus of claim 1, further comprising one or more additional controllers each coupled with the second controller, wherein each of the one or more additional controllers is configured to transmit an additional set of capacitance values to the second controller, and wherein the second controller is further configured to calculate the centroid position of the contact based on the one or more additional sets of capacitance values from the one or more additional controllers.

4. The apparatus of claim 1, wherein the first centroid position of the contact indicates a single location of the contact at the touch-sensing surface at a first time.

5. The apparatus of claim 4, wherein the centroid position of the contact includes a first position of the contact at the first time, and the first controller is further configured to:
calculate a second position of the contact at the touch-sensing surface at a second time different from the first time; and
transmit the second position to the second controller.

6. The apparatus of claim 1, wherein the edge is adjacent to the second area.

7. The apparatus of claim 1, wherein the first area includes intersections between sensor electrodes of a first touch sensor array, and wherein the second area includes intersections between sensor elements of a second touch sensor array.

8. The apparatus of claim 1, wherein the first set of capacitance values are measured from sensor electrode intersections adjacent to the second area of the touch-sensing surface, and wherein the second set of capacitance values are measured from sensor electrode intersections adjacent to the first area of the touch-sensing surface.

9. A method, comprising:
at a first controller coupled to a touch-sensing surface, wherein the touch-sensing surface includes a first area and a second area that are adjacent to each other, the first area includes a first subset of sensor elements, and the second area includes a second subset of sensor elements:
  measuring a first set of capacitance values associated with the first subset of sensor elements;
  in response to determining that a contact has occurred within a predetermined distance from an edge of the first area based on the first set of capacitance values, providing the first set of capacitance values to a second controller; and
  in response to determining that a contact has occurred in the first area at a location having at least the predetermined distance from the edge, calculating a centroid position of the contact based on the first set of capacitance values and providing the centroid position to the second controller; and
at the second controller, which is coupled to the touch-sensing surface:
  in accordance with receiving from the first controller a first set of capacitance values measured from the first area of a touch-sensing surface,
  calculating the centroid position of the contact at the touch-sensing surface based on the first set of capacitance values and the second set of capacitance values, wherein the second set of capacitance values are measured from the second subset of sensor elements of the second area, and the first set of capacitance values and the second set of capacitance values are normalized.

10. The method of claim 9, further comprising:
measuring by the second controller the second set of capacitance values.

11. The method of claim 9, further comprising:
for each of one or more additional controllers, receiving an additional set of capacitance values measured from a different area of the touch-sensing surface; and
calculating one or more positions of the contact based on the one or more additional sets of capacitance values.

12. The method of claim 9,
wherein an edge region within the predetermined distance from the edge of the first area includes an area smaller than the entire first area and is adjacent to the second area.

13. The method of claim 9, wherein the centroid position of the contact indicates a single location of the contact at the touch-sensing surface at a single point in time.

14. The method of claim 13, wherein the centroid position of the contact includes a first position of the contact at the single point in time, and the method further comprises:
in the first controller, calculating a second position of the contact at the touch-sensing surface at another point in time different from the single point in time; and
transmitting the second position from the first controller to the second controller.

15. The method of claim 9, wherein the first area includes intersections between sensor electrodes of a first touch sensor array, and wherein the second area includes intersections between sensor elements of a second touch sensor array.

16. The method of claim 9, wherein the first set of capacitance values are measured from intersections adjacent to the second area of the touch-sensing surface, and wherein the second set of capacitance values are measured from intersections adjacent to the first area of the touch-sensing surface.

17. A system, comprising:
a touch-sensing surface including a first area and a second area that are adjacent to each other, wherein the first area includes a first subset of sensor elements and the second area includes a second subset of sensor elements;
a first controller coupled with the touch-sensing surface; and
a second controller coupled with the touch-sensing surface;
wherein:
  the first controller is configured to:
  in response to determining that a contact has occurred within a predetermined distance from an edge of the first area, provide the first set of capacitance values to the second controller; and
  in response to determining that a contact has occurred in the first area at a location having at least the predetermined distance from the edge, calculate a centroid position of the contact based on the first set of capacitance values and provide the centroid position to the second controller; and the second controller is configured to:

in accordance with receiving the first set of capacitance values from the first controller, calculate the centroid position of the contact at the touch-sensing surface based on the first set of capacitance values and a second set of capacitance values, wherein the second set of capacitance values are measured from the second subset of sensor elements of the second area, and the first set of capacitance values and the second set of capacitance values are normalized.

18. The system of claim 17, further comprising one or more additional controllers each coupled with the touch-sensing surface, wherein each of the one or more additional controllers is configured to measure an additional set of capacitance values from the touch-sensing surface and transmit the additional set of capacitance values to the second controller.

19. The system of claim 18, wherein each of the one or more additional controllers is configured to measure the additional set of capacitance values from a different area of the touch-sensing surface.

20. The system of claim 17, wherein the first controller is configured to measure the first set of capacitance values from intersections adjacent to the second area of the touch-sensing surface, and wherein the second controller is configured to measure the second set of capacitance values from intersections adjacent to the first area of the touch-sensing surface.

* * * * *

UNITED STATES PATENT AND TRADEMARK OFFICE
CERTIFICATE OF CORRECTION

| | | |
|---|---|---|
| PATENT NO. | : 9,454,274 B1 | Page 1 of 1 |
| APPLICATION NO. | : 14/463240 | |
| DATED | : September 27, 2016 | |
| INVENTOR(S) | : Kurikawa | |

It is certified that error appears in the above-identified patent and that said Letters Patent is hereby corrected as shown below:

In the claims,

Claim 4, col. 17, line 22, please delete "the first centroid" and insert --the centroid--.

Signed and Sealed this
Twenty-ninth Day of November, 2016

Michelle K. Lee
*Director of the United States Patent and Trademark Office*